United States Patent
Tu et al.

(10) Patent No.: US 7,437,419 B2
(45) Date of Patent: Oct. 14, 2008

(54) SYSTEM AND METHOD FOR EFFECTIVELY PERFORMING A STREAMLINED PHOTO DISTRIBUTION PROCEDURE

(75) Inventors: Edgar A. Tu, Foster City, CA (US); Benbuck Nason, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 840 days.

(21) Appl. No.: 10/706,157

(22) Filed: Nov. 12, 2003

(65) Prior Publication Data

US 2005/0114459 A1 May 26, 2005

(51) Int. Cl.
*G06F 15/16* (2006.01)
*A63F 9/24* (2006.01)

(52) U.S. Cl. ...................... 709/206; 709/203
(58) Field of Classification Search ............... 709/206, 709/203
See application file for complete search history.

(56) References Cited

U.S. PATENT DOCUMENTS

| | | | |
|---|---|---|---|
| 5,960,411 A * | 9/1999 | Hartman et al. | 705/26 |
| 6,161,131 A * | 12/2000 | Garfinkle | 709/206 |
| 6,370,568 B1 * | 4/2002 | Garfinkle | 709/206 |
| 6,715,003 B1 * | 3/2004 | Safai | 710/33 |
| 2002/0103813 A1 * | 8/2002 | Frigon | 707/104.1 |
| 2004/0153517 A1 * | 8/2004 | Gang et al. | 709/206 |
| 2004/0201709 A1 * | 10/2004 | McIntyre et al. | 348/211.2 |
| 2005/0050150 A1 * | 3/2005 | Dinkin | 709/207 |
| 2006/0068911 A1 * | 3/2006 | Pirich et al. | 463/40 |

FOREIGN PATENT DOCUMENTS

| | | | |
|---|---|---|---|
| EP | 1280329 | | 1/2003 |
| JP | 2003-141031 | * | 5/2003 |
| WO | 0004711 | | 1/2000 |

OTHER PUBLICATIONS

"PC Game History". accessed Oct. 24, 2007. <http://www.techdock.net/PC%20Game%20History/PC%20Game%20History.htm>.*
Seiko Epson Corp., Patent Abstracts of Japan, No. 2003196668, Publication Date: Jul. 11, 2003, 1 page.

* cited by examiner

*Primary Examiner*—Glenton B. Burgess
*Assistant Examiner*—Philip J Chea
(74) *Attorney, Agent, or Firm*—Gregory J. Koerner; Redwood Patent Law

(57) ABSTRACT

A source photo manager of the source device may be utilized to designate one or more message targets for receiving the photo data from the source device. A source mail program may access the photo data to automatically create a photo message that includes the photo data and photo identifier means to request special handling of the photo data. The source mail program may then automatically transmit the photo message over the electronic network to be downloaded by a target mail program of a target device corresponding to the foregoing designated message target. The target mail program may automatically detect the photo identifier means in the photo message, and may responsively provide the photo data to a target photo manager of the target device for automatic storage into a target photo album of the target device.

51 Claims, 10 Drawing Sheets

SYSTEM AND METHOD FOR EFFECTIVELY PERFORMING A STREAMLINED PHOTO DISTRIBUTION PROCEDURE

BACKGROUND SECTION

1. Field of the Invention

This invention relates generally to techniques for distributing electronic data, and relates more particularly to a system and method for effectively performing a streamlined photo distribution procedure.

2. Description of the Background Art

Implementing effective methods for distributing electronic information is a significant consideration for designers and manufacturers of contemporary electronic devices. However, effectively distributing information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced distribution operations may provide additional benefits to a system user, but may also place increased demands on the control and management of various system components. For example, an enhanced electronic network device that effectively distributes digital image data may frequently benefit from an efficient implementation because of the large amount and complexity of the digital data involved.

Designing electronic devices that provide various types of enhanced device functionality while still maintaining a sufficient level of user-friendliness and ease-of-operation is another significant consideration when implementing electronic devices for use in certain environments in which the relative level of technical sophistication of device users is not particularly high. In addition, various types of streamlined and automated functionalities may frequently be beneficial in order to allow device users to advantageously utilize their time and energy for performing other productive tasks.

Due to growing demands on system resources and substantially increasing data magnitudes, it is apparent that developing new techniques for distributing information in an electronic network is a matter of concern for related electronic technologies. Therefore, for all the foregoing reasons, developing effective systems for distributing information in an electronic network remains a significant consideration for designers, manufacturers, and users of contemporary electronic devices.

SUMMARY

In accordance with the present invention, a system and method for effectively performing a streamlined photo distribution procedure are disclosed. In one embodiment, a source device in an electronic network may initially capture photo data from a photo data source by utilizing any appropriate and effective techniques. For example, the photo data source may be implemented as an electronic camera device, or as any other type of electronic entity for providing photo data to the source device. In certain embodiments, a source photo manager of the source device may responsively store the foregoing captured photo data into a local source photo album of the source device.

Next, the source photo manager may automatically generate a user interface on a local display for prompting a device user of the source device to designate one or more message targets for receiving a copy of the foregoing photo data. The device user of the source device may select desired message targets for the photo data by utilizing any appropriate means. For example, in certain embodiments, the device user of the source device may utilize the source photo manager to enter corresponding network addresses for the designated message targets by either utilizing a message-target address book, or by entering the foregoing network addresses manually into the foregoing user interface. In certain embodiments, one or more default message targets may be enabled for automatic selection by the device user.

In accordance with certain other embodiments of the present invention, a device user of the source device may alternately utilize the source photo manager to perform a pre-selection procedure to designated desired message targets for distributing captured photo data prior to actually capturing the photo data from the photo data source.

In certain embodiments, the source photo manager may automatically send the captured photo data to a source mail program of the source device. In response, the source mail program of the source device may automatically attach the foregoing photo data to a corresponding photo message. In addition, the source mail program may create a special photo identifier tag in a message header of the photo message to thereby identify the photo message as including the captured photo data for automatic distribution to the designated message targets.

In various alternate embodiments, the source device may similarly utilize any other effective techniques to identify the photo message as requiring special handling for the attached photo data by the designated message targets. The source mail program of the source device may then automatically transmit the foregoing photo message with the special photo identifier tag and attached photo data to an appropriate network server in the electronic network.

In accordance with the certain embodiments of the present invention, a device user of a target device in the electronic network may utilize a target mail program of the target device to log-in to the foregoing network server of the electronic network by utilizing any effective means. The target mail program of the target device may then download the photo message from the network server over the electronic network. Next, a special photo-message reader from the target mail program may automatically decode the message header of the downloaded photo message by utilizing any effective techniques.

For example, in certain embodiments, the photo-message reader of the target mail program may sequentially parse the message header to detect the special photo identifier tag that specifically identifies the corresponding photo message as including attached photo data that requires automatic handling by the target device. If the photo-message reader of the target mail program successfully detects the photo identifier tag in the message header of the photo message, then the target mail program may automatically provide the corresponding photo data from the photo message to a target photo manager of the target device. Finally, the target photo manager of the target device may automatically store the received photo data into a local target photo album corresponding to the target device for utilization by the device user of the target device. The present invention thus provides a streamlined, efficient, and user-friendly mechanism for distributing photo data to designated target devices to thereby automatically populate and synchronize photo albums on a source device and designated target devices.

DETAILED DESCRIPTION

The present invention relates to an improvement in electronic information distribution techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing a streamlined photo distribution procedure, and may include a photo data source that provides photo data to a source device in the electronic network, and a source photo manager of the source device for designating one or more message targets for receiving the photo data from the source device. A source mail program may automatically access the photo data to automatically create a photo message that includes the photo data and photo identifier means to request special handling of the photo data.

The source mail program may automatically transmit the photo message over said electronic network for downloading by a target mail program of a target device corresponding to the foregoing designated message target. The target mail program may then automatically detect the photo identifier means in the photo message, and may responsively provide the photo data to a target photo manager of the target device for automatic storage into a target photo album of the target device.

Figure 1:
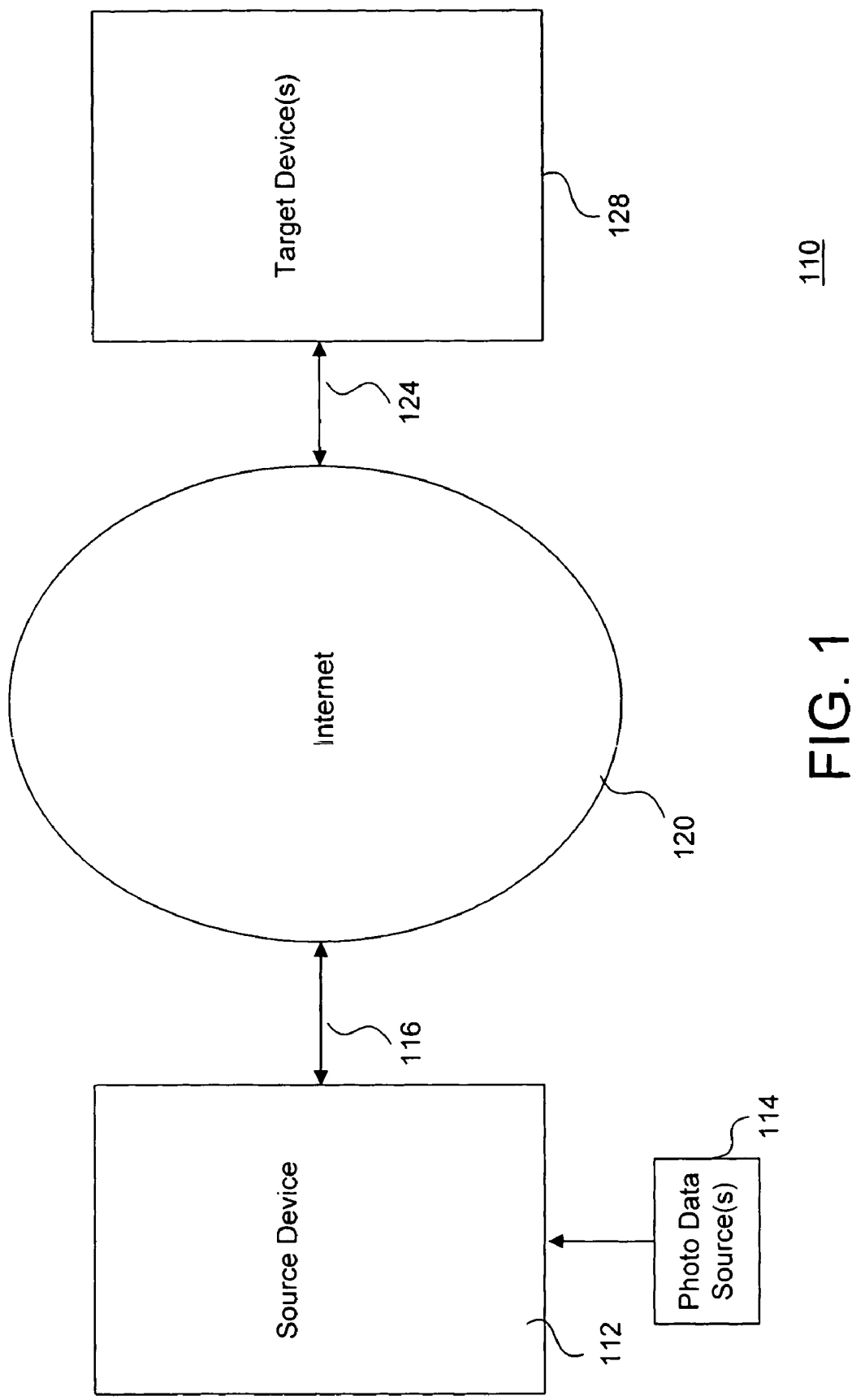
FIG. 1 is a block diagram of an electronic network, in accordance with one embodiment of the present invention.

Referring now to FIG. 1, a block diagram of an electronic network 110 is shown, in accordance with one embodiment of the present invention. In the FIG. 1 embodiment, electronic network 110 may preferably include, but is not limited to, a source device 112, one or more photo data sources 114, an Internet 120, and one or more target devices 128. In alternate embodiments, electronic network 110 may readily be implemented using various components and configurations in addition to, or instead of, those discussed in conjunction with the FIG. 1 embodiment.

In the FIG. 1 embodiment, source device 112 and target device(s) 128 may be implemented as any type of appropriate electronic devices. For example, in certain embodiments, source device 112 and target device(s) 128 may be implemented as stationary or portable consumer-electronics entertainment devices, as further discussed below in conjunction with FIG. 3. In the FIG. 1 embodiment, source device 112 and target device(s) 128 may utilize respective messaging software to communication through Internet 120.

In the FIG. 1 embodiment, photo data source(s) 114 may include any appropriate source of photo data. For example, photo data source(s) 114 may include, but are not limited to, various types of electronic camera devices that may capture photo data either locally or remotely. In certain embodiments, photo data source(s) may also include other electronic devices capable of either capturing or storing photo data for subsequently downloading to source device 112. For example, photo data source(s) 114 may include, but are not limited to, a camcorder (a portable video camera with built-in recorder), a digital camera device, an audio-related electronic device, or a webcam device that is configured to capture and provide photographic image data to a distributed computer network such as the Internet. In addition, in accordance with the present invention, source device 112 may receive or access any other desired type of data for performing a streamlined distribution procedure. The concepts and principles of the present invention are therefore not limited to distributing image data, but may readily be applied to any other type of electronic information.

In accordance with the present invention, source device 112 may automatically transmit the foregoing photo data to one or more designated target device(s) 128 which may then automatically store the transmitted photo data locally for use by corresponding device users of the target device(s) 128. In certain embodiments, Internet 120 may be implemented as any other type of distributed electronic network including, but not limited to, an intranet configuration. Furthermore, in other embodiments, source device 112 and target device(s) 128 may alternately communicate directly with each other using appropriate peer-to-peer communication techniques. The implementation and utilization of source device 112 is further discussed below in conjunction with FIG. 2 through FIG. 9.

Figure 2:
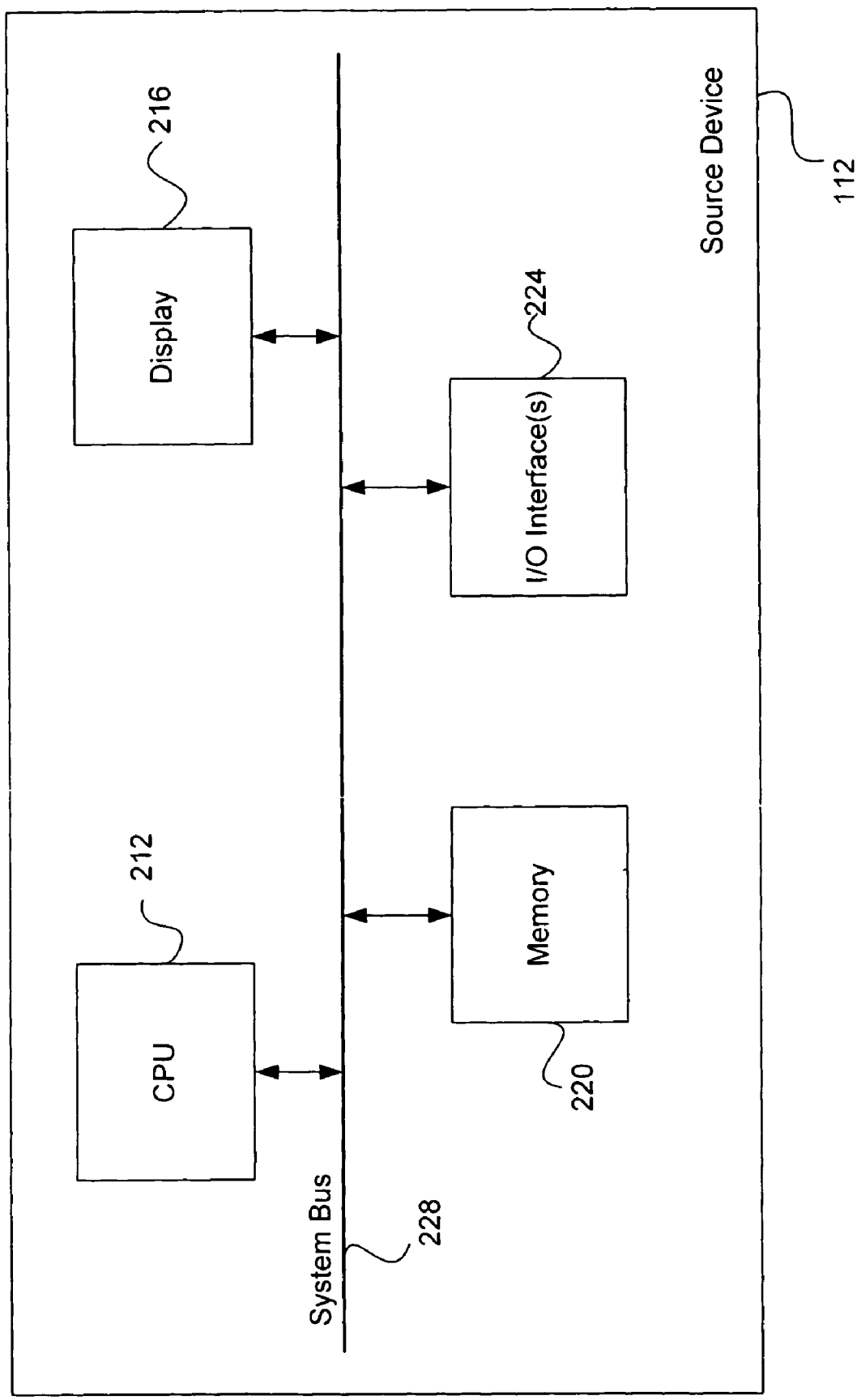
FIG. 2 is a block diagram for one embodiment of the source device of FIG. 1, in accordance with the present invention.

Referring now to FIG. 2, a block diagram for one embodiment of the FIG. 1 source device 112 is shown, in accordance with the present invention. In the FIG. 2 embodiment, source device 112 preferably may include, but is not limited to, a central processing unit (CPU) 212, a display 216, a memory 220, and one or more input/output interface(s) (I/O interface(s)) 224. The foregoing components of source device 112 may preferably be coupled to, and communicate through, a system bus 228. In alternate embodiments, source device 112 may readily be implemented using various components and configurations in addition to, or instead of, those discussed in conjunction with the FIG. 2 embodiment.

In the FIG. 2 embodiment, CPU 212 may be implemented to include any appropriate and compatible microprocessor device that preferably executes software instructions to thereby control and manage the operation of source device 112. The FIG. 2 display 216 may include any effective type of display technology including a cathode-ray-tube monitor or a liquid-crystal display device with an appropriate screen for displaying various information to a device user.

In the FIG. 2 embodiment, memory 220 maybe implemented as computer-readable medium to include any combination of desired storage devices, including, but limited to, read-only memory (ROM), random-access memory (RAM), and various types of non-volatile memory, such as floppy disks, memory sticks, compact disks, or hard disks.

The contents and functionality of memory 220 are further discussed below in conjunction with FIG. 3.

In the FIG. 2 embodiment, I/O interface(s) 224 may include one or more input and/or output interfaces to receive and/or transmit any required types of information by source device 112. I/O interface(s) 224 may include one or more means for allowing a device user to communicate with source device 112. For example, the foregoing means may include a keyboard device, a wireless remote-control device, a speech-recognition module with corresponding microphone, a graphical user interface with touch-screen capability, a handheld device controller unit, or a selection button array mounted externally on source device 112.

The foregoing FIG. 2 embodiment is discussed above in the context of an implementation of source device 112. However, in certain embodiments of electronic network 110, various target device(s) 128 may be also be implemented in a manner that is the same or similar to the configuration and functionalities discussed above in conjunction with the FIG. 2 embodiment of source device 112.

Figure 3:
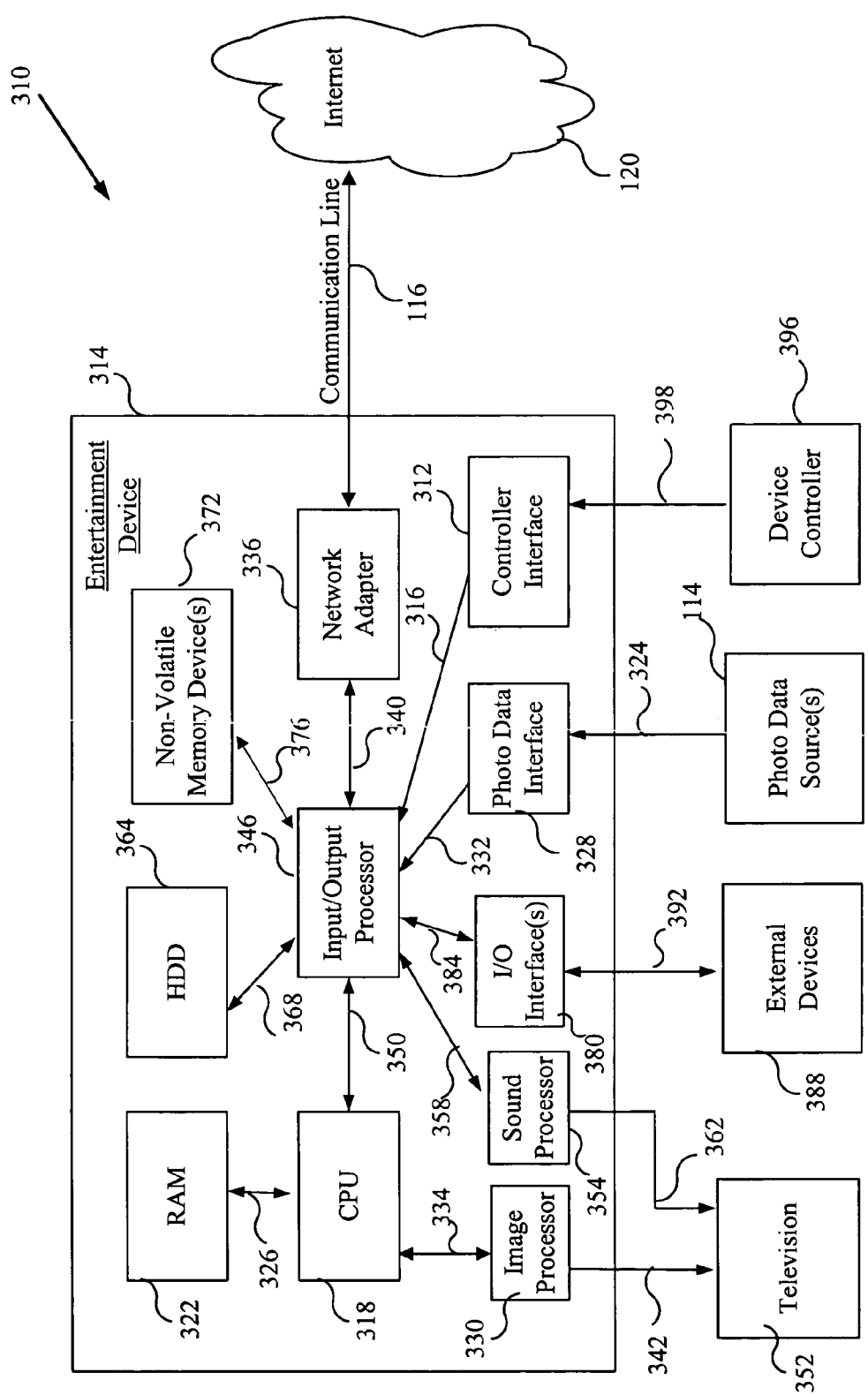
FIG. 3 is a block diagram for one embodiment of an entertainment system, in accordance with the present invention.

Referring now to FIG. 3, a block diagram for one embodiment of an entertainment system 310 is shown, in accordance with certain embodiments of the present invention. The FIG. 3 entertainment system 310 may include, but is not limited to, one or more photo data source(s) 114, an entertainment device 314, a television 352, and at least one device controller 396. In alternate embodiments, entertainment system 310 may readily be implemented using various components, functionalities, and configurations in addition to, or instead of, those discussed in conjunction with the FIG. 3 embodiment.

In accordance with various embodiments of the present invention, entertainment device 314 may be implemented in any effective and appropriate manner. For example, in certain embodiments, entertainment device 314 may be effectively implemented as a Sony PlayStation® device. Furthermore, in certain embodiments of the present invention, the source device 112 and target device(s) 128 that are shown and discussed in conjunction with foregoing FIG. 1 may be implemented and configured in a same or similar manner to that shown herein for entertainment device 314 of FIG. 3.

In the FIG. 3 embodiment, entertainment device 314 may include a input/output processor (IOP) 346 that coordinates transfers of various types of information for entertainment device 314. In the FIG. 3 embodiment, IOP 346 may communicate with a central processing unit (CPU) 318 via path 350. In addition, IOP 346 may communicate with a hard disk drive (HDD) 364 via path 368, and with various types of non-volatile memory devices 372 via path 376. In the FIG. 3 embodiment, non-volatile memory devices 372 may include, but are not limited to, compact disks, memory sticks, and floppy disks.

In the FIG. 3 embodiment, IOP 346 may also communicate with various external devices 388 via path 384, I/O interfaces 380, and path 392. External devices 388 may include any appropriate electronic entities that may be coupled to entertainment device 314. For example, in certain embodiments, external devices 388 may include various types of electronic devices that support an IEEE 1394 interconnectivity standard, or a Universal Serial Bus (USB) standard. In the FIG. 3 embodiment, a device user of entertainment system 310 may exchange various types of control and user-interface communications with IOP 346 of entertainment device 314 by utilizing device controller 396 via path 398, controller interface 312, and path 316.

In the FIG. 3 embodiment, CPU 318 may communicate with random-access memory (RAM) 322 via path 326 to temporarily store or access various types of electronic information. In the FIG. 3 embodiment, CPU 318 may also provide various types of image data to television 352 via path 334, image processor 330, and path 342 for viewing by a device user of entertainment system 310. Similarly, IOP 346 may provide various types of sound data to television 352 via path 358, sound processor 354, and path 362 for use by the foregoing device user of entertainment system 310.

In the FIG. 3 embodiment, photo data source(s) 114 may provide various types of photo data to IOP 346 via path 324, photo data interface 328, and path 332. Photo data source(s) 114 may include any appropriate source of photo data in any desired and supported format. For example, photo data source(s) 114 may include, but are not limited to, various types of electronic camera devices that may capture photo data either locally or at a remote location. In certain embodiments, photo data source(s) 114 may also include other types of stationary or portable electronic devices capable of either capturing or storing photo data for subsequently downloading to entertainment device 314 by utilizing either hard-wired or wireless techniques.

Digital camera devices such as photo data source 114 and electronic gaming devices such as entertainment device 314 have traditionally been stand-alone off-line devices. Certain embodiments of the present invention effectively combine functionalities of photo data source 114 and entertainment device 314 in an on-line networked environment to support an automatic streamlined distribution model for various appropriate types of electronic information.

In the FIG. 3 embodiment, entertainment device 314 may perform various communications with Internet 120 via IOP 346, path 340, network adapter 336, and communication line 116. In alternate embodiments, Internet 120 may be implemented as any other type of distributed electronic network including, but not limited to, an intranet configuration. Furthermore, in other embodiments, a source device 112 (such as the entertainment device 314 of FIG. 3) may alternately communicate directly with target device(s) 128 (FIG. 1) using appropriate peer-to-peer communication techniques.

Figure 4:
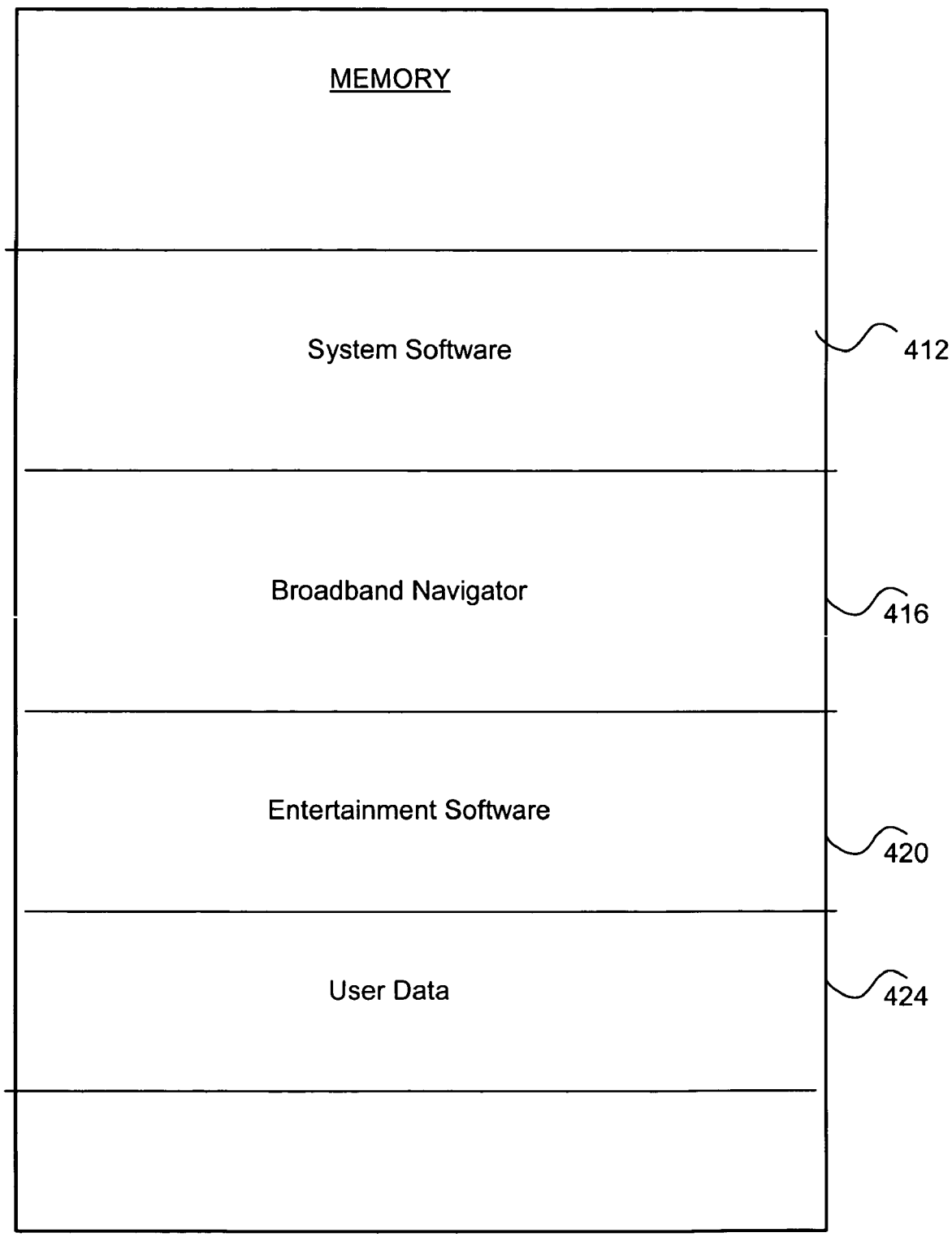
FIG. 4 is a block diagram for one embodiment the memory of FIG. 2, in accordance with the present invention.

Referring now to FIG. 4, a block diagram for one embodiment of the FIG. 2 memory 220 is shown, in accordance with the present invention. In the FIG. 4 embodiment, memory 220 preferably includes, but is not limited to, system software 412, a broadband navigator 416, entertainment software 420, and user data 424. In alternate embodiments, memory 220 may readily include various other components in addition to, or instead of, those components discussed in conjunction with the FIG. 4 embodiment.

In the FIG. 4 embodiment, system software 412 may include program instructions that are preferably executed by CPU 212 (FIG. 2) to perform various functions and operations for source device 112. The particular nature and functionality of system software 412 typically varies depending upon factors such as the specific type and particular functionality of the corresponding source device 112.

In the FIG. 4 embodiment, source device 112 may utilize broadband navigator 416 to perform various control and communication functions for source device 112. One embodiment for implementing broadband navigator 416 is further discussed below in conjunction with FIG. 5. In the FIG. 4 embodiment, entertainment software 420 may include any appropriate types of software and other related information for performing various entertainment functions for source device 112. For example, entertainment software 420 may include any desired number of computer gaming programs and associated gaming data.

In the FIG. 4 embodiment, user data 424 may include any appropriate information for use by source device 112. For example, user data 424 may include, but is not limited to, one or more photo albums for locally storing photo data for source device 112. One embodiment for implementing a photo album is further discussed below in conjunction with FIG. 6.

The foregoing FIG. 4 embodiment is discussed above in the context of an implementation of memory 220 for source device 112. However, in certain embodiments of electronic network 110, memory resources of various target device(s) 128 may be also be implemented in a manner that is the same or similar to the configuration and functionalities discussed above in conjunction with the FIG. 4 embodiment. In addition, the memory resources of the FIG. 3 entertainment device 314 (such as HDD 364) may include various components which are the same or similar to those discussed in conjunction with memory 220 of FIG. 4.

Figure 5:
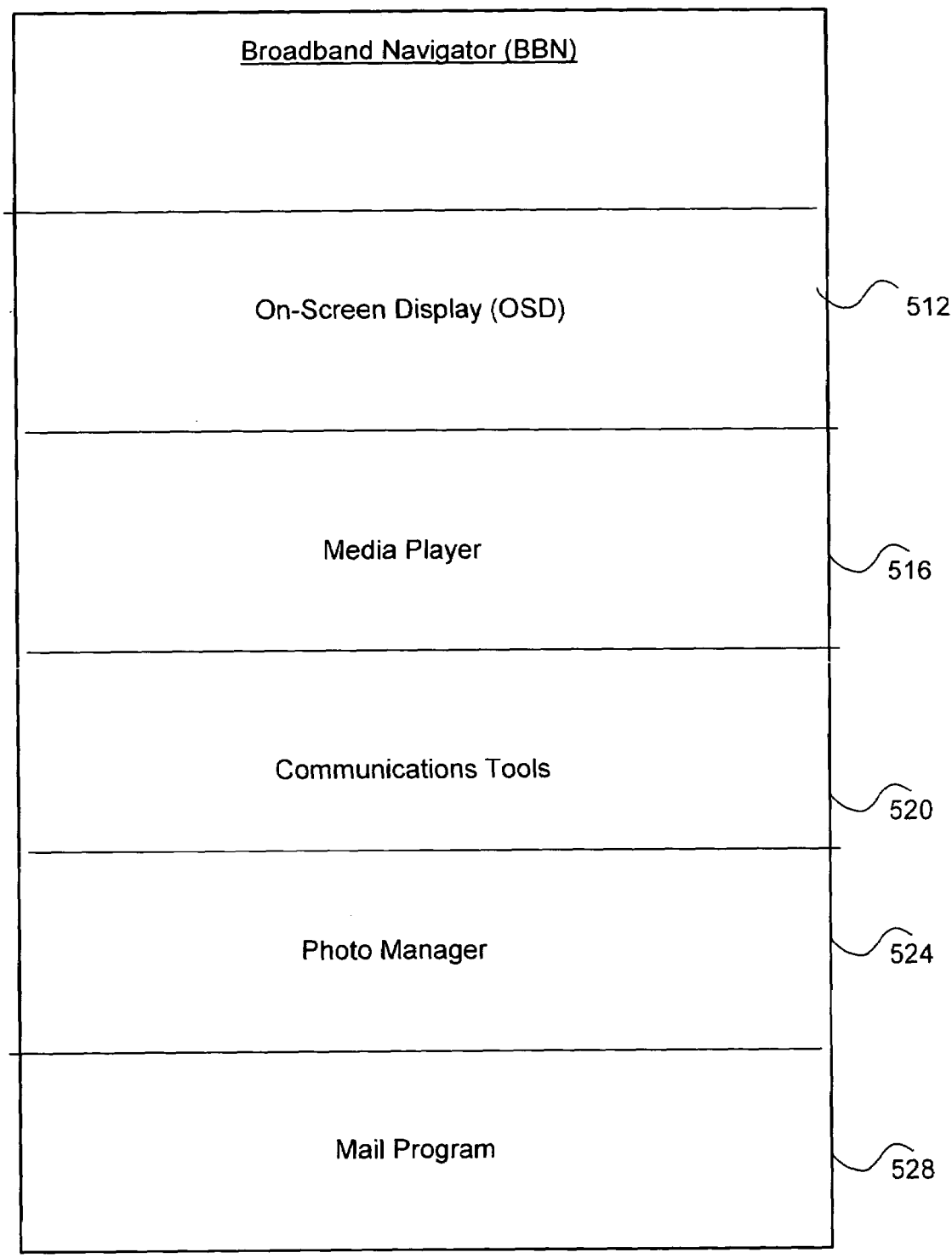
FIG. 5 is a block diagram for one embodiment the broadband navigator of FIG. 4, in accordance with the present invention.

Referring now to FIG. 5, a diagram for one embodiment of the FIG. 4 broadband navigator 416 is shown, in accordance with the present invention. In the FIG. 5 embodiment, broadband navigator 416 may include, but is not limited to, an on-screen display module (OSD) 512, a media player 516, communication tools 520, a photo manager 524, and a mail program 528. In alternate embodiments, broadband navigator 416 may readily include various other elements and functionalities in addition to, or instead of, those elements and functionalities discussed in conjunction with the FIG. 5 embodiment.

In the FIG. 5 embodiment, source device 112 may utilize OSD 512 to provide various types of displays and user interfaces on display 216 (FIG. 2). For example, OSD 512 may provide various user interfaces for specifying system settings for source device 112. In the FIG. 5 embodiment, source device 112 may utilize media player 516 to reproduce various types of media on source device 112. For example, media play 516 may reproduce video and/or audio data on source device 112. In the FIG. 5 embodiment, communication tools 520 may include any appropriate programs, data, or other components for performing corresponding communications functions with source device 112.

In the FIG. 5 embodiment, source device 112 may advantageously utilize photo manager 524 to capture photo data from one or more photo data source(s) (FIG. 1) and automatically distribute the captured photo data to one or more designated target devices 128 in electronic network 110 (FIG. 1). In addition, the designated target devices 128 in electronic network 110 may utilize a similar photo manager 524 to automatically handle the foregoing photo data from source device 112. Photo manager 524 may also be utilized to manage photo data in any desired manner. The utilization and functionality of photo manager 524 is further discussed below in conjunction with FIGS. 8-10.

In the FIG. 5 embodiment, source device 112 may utilize mail program 528 to create and send various types of electronic messages from source device 112 to designated target devices 128 in electronic network 110. In addition, the designated target devices 128 in electronic network 110 may utilize a similar mail program 528 to receive the foregoing electronic messages from source device 112. The utilization and functionality of mail program 528 is further discussed below in conjunction with FIGS. 8-10.

Figure 6:
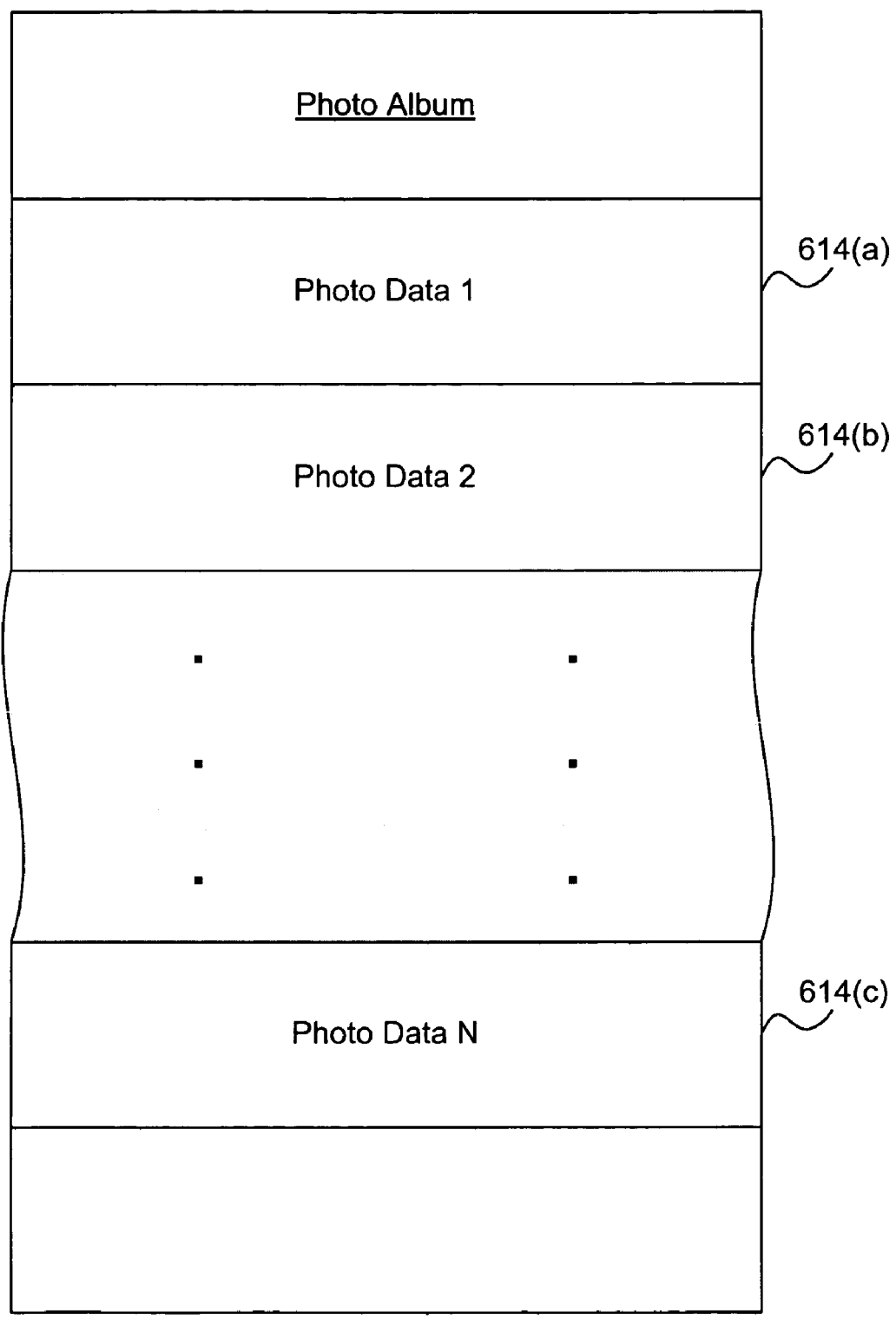
FIG. 6 is a block diagram for one embodiment of a photo album, in accordance with the present invention.

Referring now to FIG. 6, a diagram for one embodiment of a photo album 610 is shown, in accordance with the present invention. In the FIG. 6 embodiment, photo album 610 may include, but is not limited to, photo data 1 614(*a*) through photo data N 614(*c*). In alternate embodiments, photo album 610 may readily include various other elements and functionalities in addition to, or instead of, those elements and functionalities discussed in conjunction with the FIG. 6 embodiment. For example, at any given time, photo album 610 may include any number of sets of photo data 614. In addition, source device 112 or target device(s) 128 (FIG. 1) may readily each include a plurality of photo albums 610.

In the FIG. 6 embodiment, photo data 1 614(*a*) through photo data N 614(*c*) may each include digital image data corresponding to an electronic photograph captured from a photo data source 128 (FIG. 1). In addition, in certain embodiments, photo data 1 614(*a*) through photo data N 614(*c*) may each include various types of ancillary data associated with the corresponding digital image data. For example, the foregoing ancillary data may include, but is not limited to, an image capture date and time, an image capture location, image format information, and various types of user-generated image annotation information. In certain embodiments, the foregoing ancillary data may be displayed in conjunction with corresponding photo data 614. The utilization of photo album 610 is further discussed below in conjunction with FIGS. 8-10.

Figure 7:
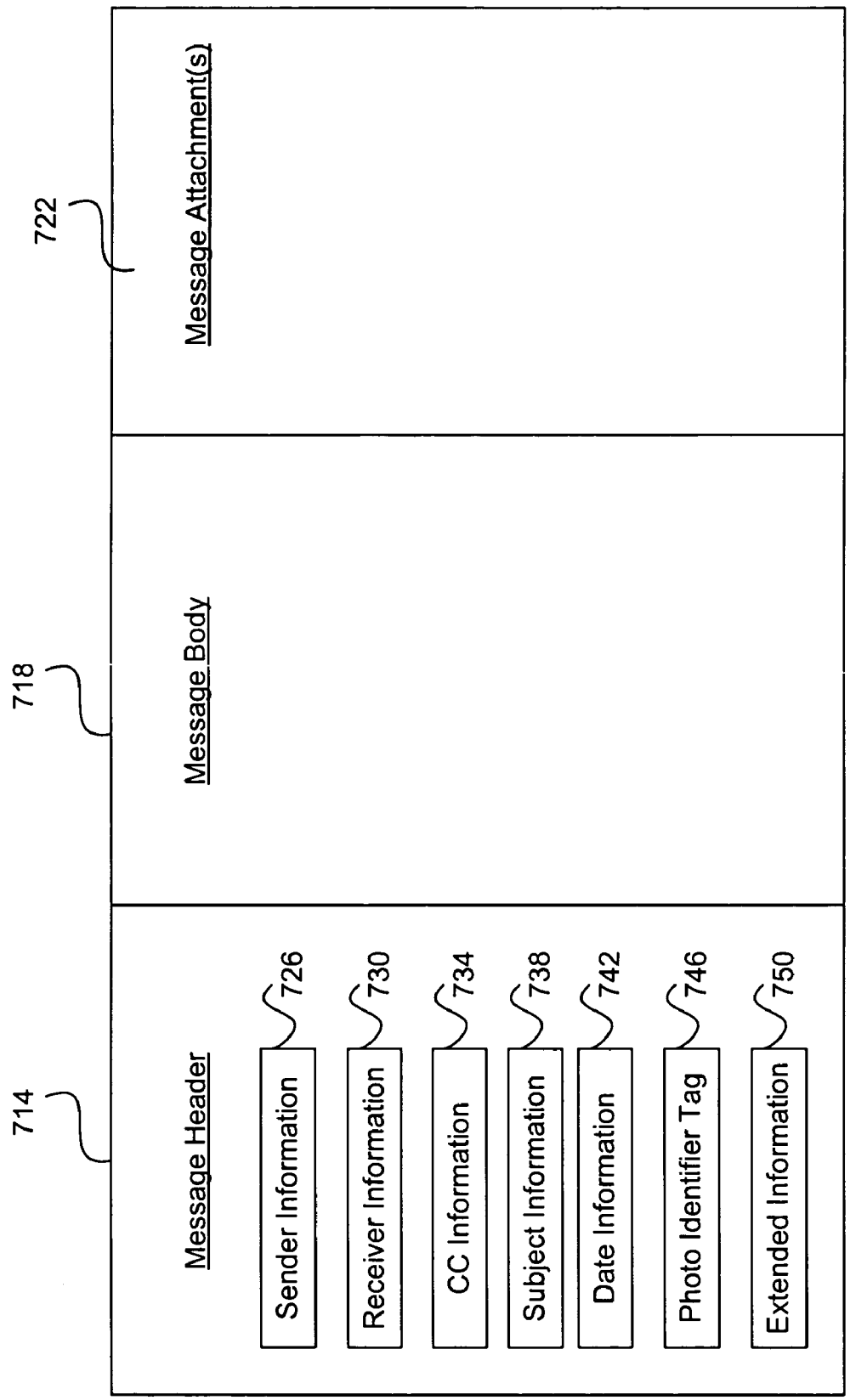
FIG. 7 is a block diagram for one embodiment of a photo message, in accordance with the present invention.

Referring now to FIG. 7, a diagram for one embodiment of a photo message 710 is shown, in accordance with the present invention. In the FIG. 7 embodiment, photo message 710 may include, but is not limited to, a message header 714, a message body 718, and one or more message attachments 722. In alternate embodiments, photo message 710 may readily include various other elements and functionalities in addition to, or instead of, those elements and functionalities discussed in conjunction with the FIG. 7 embodiment.

In the FIG. 7 embodiment, a mail program 528 of source device 112 may automatically create photo message 710 in response to a photo message request from photo manager 524 (FIG. 5). In the FIG. 7 embodiment, message header 714 may include, but is not limited to, sender information 726 to identify a message sender of photo message 710, receiver information 730 to identify a message target for photo message 710, CC information 734 to identify addition message targets for photo message 710, and date information 742 to indicate the date (and potentially the time) that photo message 710 was created.

In the FIG. 7 embodiment, message header 714 may also advantageously include a special photo identifier tag 746 created by mail program 528 of source device 112 in response to the foregoing photo message request from photo manager 524. For example, in certain embodiments, photo identifier tag 746 may be implemented as "X-PSPHOTO" or any other appropriate text string. In accordance with the present invention, mail programs 528 in designated target devices 128 may then parse message header 714 to detect the photo identifier tag 746. The special photo identifier tag 746 thus identifies photo message 710 as containing attached photo data for automatically populating local photo albums 610 in corresponding target devices 128, in accordance with the present invention.

In the FIG. 7 embodiment, extended information 750 may include any appropriate type of additional information associated with the corresponding photo message 710. For example, extended information 750 may include information for cataloguing, organizing, or identifying corresponding photo data 614. Message body 718 may include various types of optional text messages for transmission with photo message 710. Message attachment(s) 722 may include at least one attachment of photo data 614 for distribution from source device 112 to designated message targets in electronic network 110. The utilization and implementation of photo message 710 and photo identifier tag 746 are further discussed below in conjunction with FIGS. 8-10.

Figure 8:
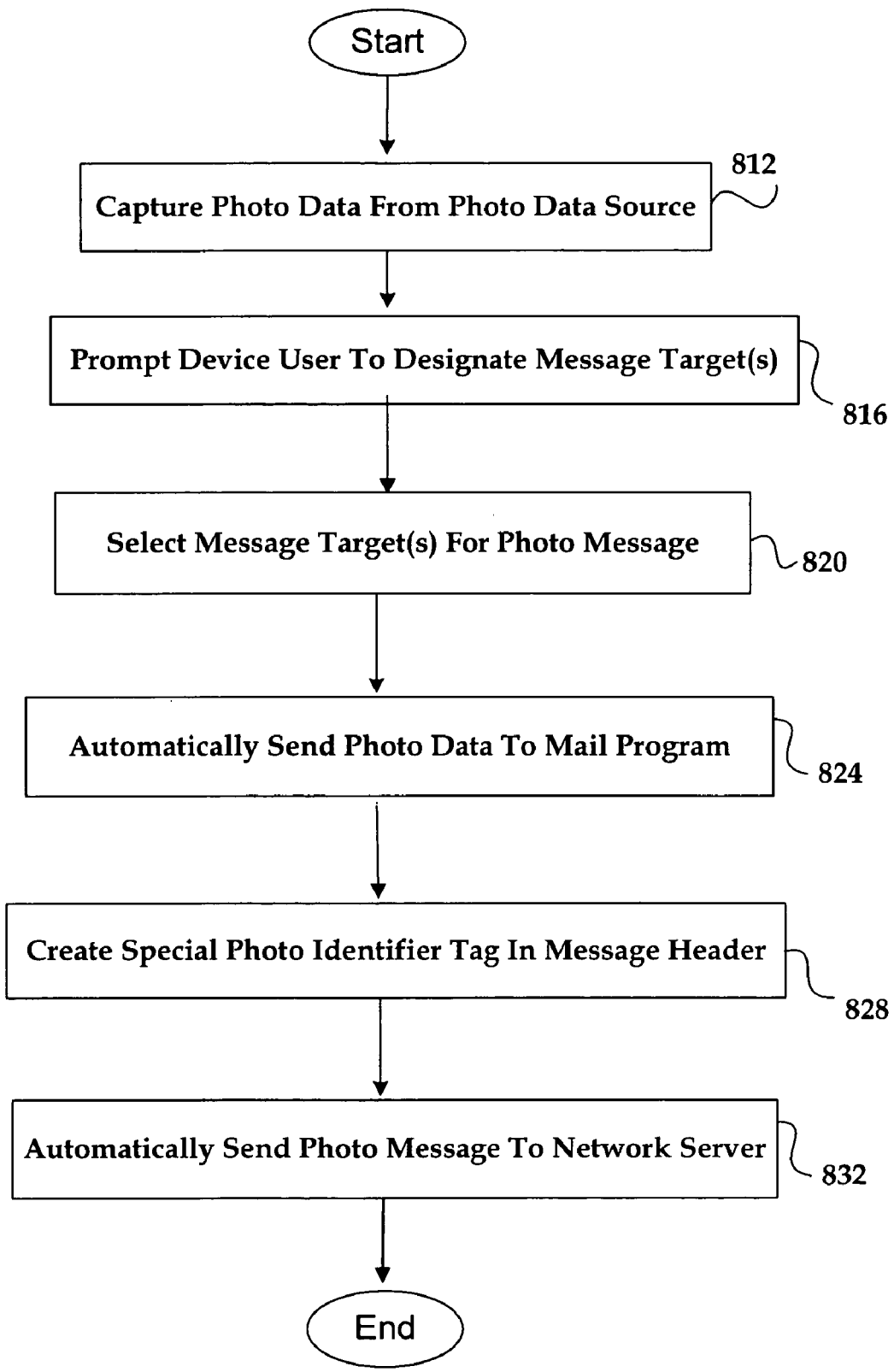
FIG. 8 is a flowchart of method steps for performing a photo message transmission procedure, in accordance with one embodiment of the present invention.

Referring now to FIG. 8, a flowchart of method steps for performing a photo message transmission procedure is shown, in accordance with one embodiment of the present invention. The FIG. 8 example is presented for purposes of illustration, and in alternate embodiments, the present invention may readily utilize various other steps and sequences than those discussed in conjunction with the FIG. 8 embodiment.

In accordance with certain embodiments of the present invention, in step 812, a source device 112 in an electronic network 110 may initially capture photo data from a photo data source 114 by utilizing any appropriate and effective techniques. For example, photo data source 114 may be implemented as an electronic camera device, or as any other type of electronic entity for providing photo data to source device 112. In the FIG. 8 embodiment, a photo manager 524 of source device 112 may responsively store the foregoing captured photo data into a local photo album 610 of source device 112.

In certain embodiments of the present invention, photo data source 114 may be implemented as any appropriate type of portable electronic device with imaging capability (such as a cell-phone with built-in camera) that may remotely capture photo data for performing the streamlined distribution procedure. The foregoing portable electronic device may then automatically transmit the captured photo data to source device 112 via any appropriate distributed electronic network by utilizing either wireless or hard-wired communications techniques.

In certain embodiments, using techniques similar to those discussed above in conjunction with the FIG. 7 embodiment, photo data source 114 may create a special photo identifier tag 746 to send along with the captured photo data that is transmitted to source device 112. The foregoing special photo identifier tag 746 may be created by photo data source 114 to indicate that source device 112 should utilize the transmitted photo data for automatically populating local photo albums 610 in corresponding target devices 128.

In step 816, photo manager 524 may automatically generate a user interface on display 216 (FIG. 2) for prompting a device user of source device 112 to designate one or more message targets for receiving a copy of the foregoing photo data. Then, in step 820, the device user of source device 112 may select desired message targets for the photo data by utilizing any appropriate means. For example, in certain embodiments, the device user of source device 112 may utilize photo manager 524 to enter corresponding network addresses for the designated message targets by either utilizing a message-target address book, or by entering the foregoing network addresses manually into the foregoing user interface. In certain embodiments, one or more default message targets may be enabled for automatic selection by the device user.

In certain embodiments, the device user may select a group address in foregoing step 820 to select a pre-defined group of desired message targets for automatically receiving photo data. In addition, various message targets may share a particular photo album 610 that may have a corresponding album address. A device user may thus select an appropriate album address for propagating the photo data to all message targets that share that particular photo album 610. For example, a first photo album may be shared by family members, a second photo album may be shared by a group of friends, and a third photo album may be shared by a group of co-workers. In such a scenario, all family members may each have a copy of the first photo album on their individual devices. When one family member captures photo data and selects the first photo album address, then each copy of the first photo album may be automatically updated to include the captured photo data.

In a first embodiment, designated message targets may receive photographs from a source device 112 by utilizing corresponding target devices 128. Each of the target devices 128 may then store the received photographs directly into an inbox of that target device 128. In such an implementation, if a particular message target is a member of more than one photo album group, then photographs for multiple different photo albums may be received and stored in the same inbox of the corresponding target device 128.

In the first embodiment, a device user of source device 112 may capture and automatically transmit photo data by utilizing either a single-action ("one click") technique or a multiple-action ("two click") technique. For example, the device user may simply select a message target or a group of message targets to trigger both capturing and automatically transmitting photo data using a single-action technique. Alternately, the device user may utilize a multiple-action technique by first capturing the photo data, and then subsequently selecting a message target or a group of message targets to trigger automatically transmitting the photo data.

In a second embodiment, designated message targets may similarly receive photographs from source device 112 by utilizing corresponding target devices 128. In the second embodiment, each group of message targets preferably corresponds directly to a single photo album. Each of the target devices 128 may initially receive photographs in an inbox of that target device 128. However, appropriate software of the target device 128 may later automatically classify and distribute the received photographs from the inbox to an appropriate photo album folder on the corresponding target device 128.

In the second embodiment, a device user of source device 112 may capture and automatically transmit photo data by utilizing either a single-action ("one click") technique or a multiple-action ("multiple click") technique. For example, the device user may simply select a photo album to trigger both capturing and automatically transmitting photo data using a single-action technique. In the single-action technique, a message target may not need to be selected because specific message targets may be associated with a particular photo album. Alternately, the device user may utilize a multiple-action technique by first capturing the photo data, and then subsequently selecting a photo album to trigger automatically transmitting the photo data. In certain instances, the device user may also include a separate middle step to choose specific message targets.

In a third embodiment, each group of message targets may be associated with multiple different photo album folders. In addition, as in the previous two embodiments, a given message target may be a member of multiple message target groups. Each of the target devices 128 may initially receive photographs in an inbox of that target device 128. Appropriate software of the target device 128 may then automatically classify and distribute the received photographs from the inbox to an appropriate photo album folder on the corresponding target device 128.

In the third embodiment, a device user of source device 112 may capture and automatically transmit photo data by utilizing either a single-action ("one click") technique or a multiple-action ("multiple click") technique. For example, the device user may simply select a photo album to trigger both capturing and automatically transmitting photo data using a single-action technique. In the single-action technique, a message target may not need to be selected because specific message targets may be associated with a particular photo album. Alternately, the device user may utilize a multiple-action technique by first capturing the photo data, and then subsequently selecting a photo album to trigger automatically transmitting the photo data. In certain instances, the device user may also include a separate middle step to choose specific message targets.

In step 824, photo manager 524 may automatically send the captured photo data to a mail program 528 (FIG. 5) of source device 112 when the desired message targets have been selected in foregoing step 820. In certain embodiments, photo manager 524 may also concurrently send a photo message request to mail program 528 of source device 112 to thereby identify the corresponding photo data for attachment to a special photo message 710 intended for automatic distribution to the designated message targets.

In step 828, mail program 528 of source device 112 may automatically attach the foregoing photo data from photo manager 524 to a corresponding photo message 710 (FIG. 7). In addition, mail program 528 may create a special photo identifier tag 746 in a message header 714 of photo message 710 to thereby identify photo message 710 as including the captured photo data for automatic distribution to the designated message targets.

In the FIG. 8 embodiment, source device 112 generates a special photo identifier tag 746 to identify photo message 710 from the designated message targets. However, in various alternate embodiments, source device 112 may also utilize any other effective techniques to identify photo message 710 as requiring special handling of the attached photo data by designated message targets.

Finally, in step 832, mail program 528 of source device 112 may automatically transmit the foregoing photo message 710 with the special photo identifier tag 746 and attached photo data to an appropriate network server in electronic network 110. The FIG. 8 process may then terminate. The FIG. 8 embodiment thus provides a flexible "two-click" method for automatically transmitting photo data from source device 112 to selected messaging targets in electronic network 110.

Figure 9:
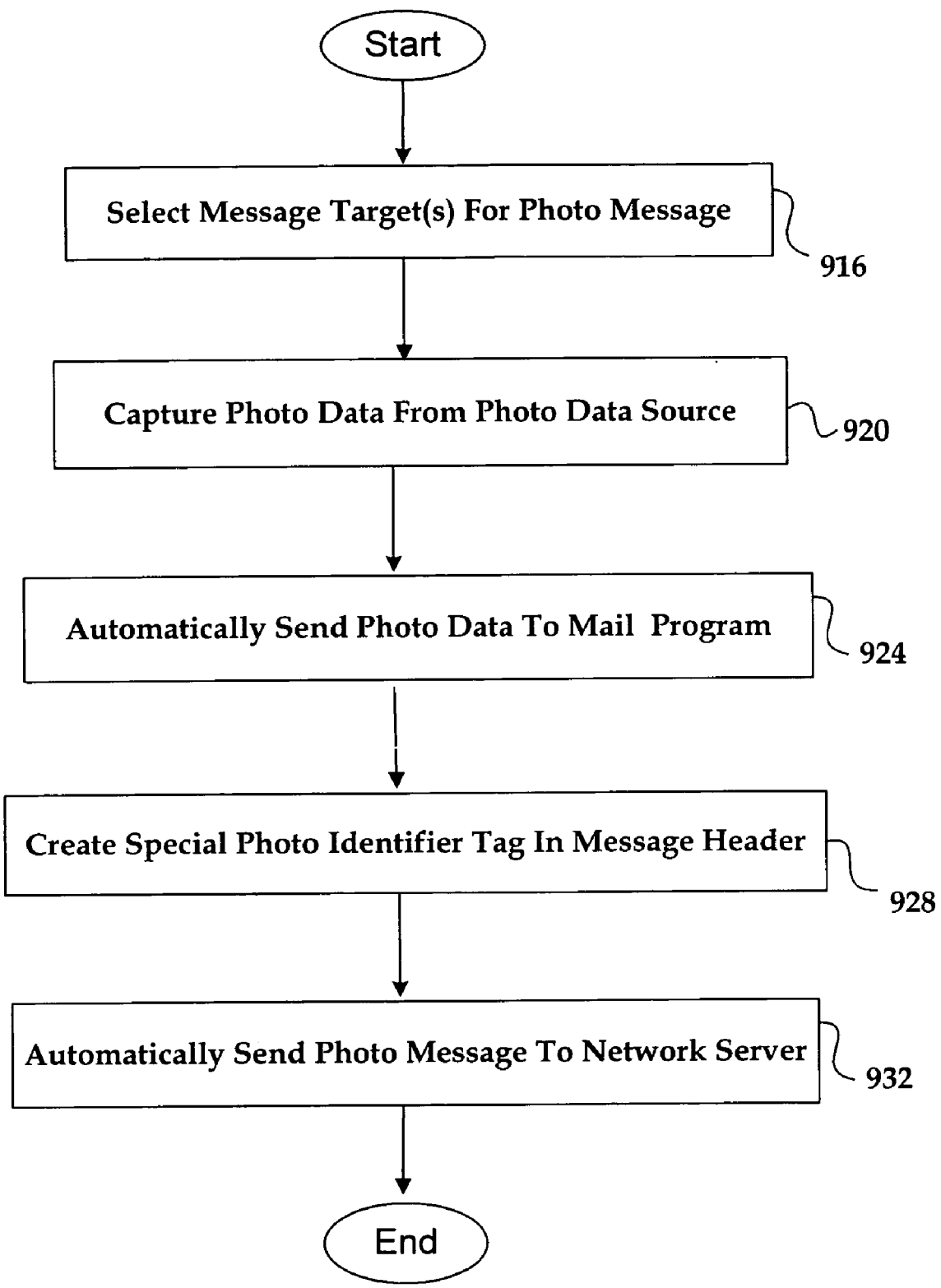
FIG. 9 is a flowchart of method steps for performing a photo message transmission procedure, in accordance with one embodiment of the present invention.

Referring now to FIG. 9, a flowchart of method steps for performing a photo message transmission procedure is shown, in accordance with one embodiment of the present invention. The FIG. 9 example is presented for purposes of illustration, and in alternate embodiments, the present invention may readily utilize various other steps and sequences than those discussed in conjunction with the FIG. 9 embodiment.

In accordance with certain embodiments of the present invention, in step 916, a device user of a source device 112 in an electronic network 110 may utilize a photo manager 524 to pre-select desired message targets for distributing captured photo data by utilizing any appropriate means. For example, in certain embodiments, the device user of source device 112 may utilize photo manager 524 to enter corresponding network addresses for the designated message targets by either utilizing a message-target address book, or by entering the foregoing network addresses manually into the foregoing user interface. In certain embodiments, one or more default message targets may be enabled for automatic selection by the device user.

Then, in step 920, the source device 112 may subsequently utilize photo manager 524 to capture photo data from a photo data source 114 by utilizing any appropriate and effective techniques. For example, photo data source 114 may be implemented as an electronic camera device, or as any other type of electronic entity for providing photo data to source device 112. In the FIG. 9 embodiment, a photo manager 524 of source device 112 may responsively store the foregoing captured photo data into a local photo album 610 of source device 112.

In certain embodiments of the present invention, photo data source 114 may be implemented as any appropriate type of portable electronic device with imaging capability (such as a cell-phone with built-in camera) that may remotely capture photo data for performing the streamlined distribution procedure. The foregoing portable electronic device may then automatically transmit the captured photo data to source device 112 via any appropriate distributed electronic network by utilizing either wireless or hard-wired communications techniques.

In certain embodiments, using techniques similar to those discussed above in conjunction with the FIG. 7 embodiment, photo data source 114 may create a special photo identifier tag 746 to send along with the captured photo data that is transmitted to source device 112. The foregoing special photo identifier tag 746 may be created by photo data source 114 to indicate that source device 112 should utilize the transmitted photo data for automatically populating local photo albums 610 in corresponding target devices 128.

In response to receiving the foregoing photo data, in step 924, photo manager 524 may automatically send the captured photo data to a mail program 528 (FIG. 5) of source device 112. In certain embodiments, photo manager 524 may also concurrently send a photo message request to mail program 528 of source device 112 to thereby identify the corresponding photo data for attachment to a special photo message 710 intended for automatic distribution to the designated message targets.

In step 928, mail program 528 of source device 112 may automatically attach the foregoing photo data from photo manager 524 to a corresponding photo message 710 (FIG. 7). In addition, mail program 528 may create a special photo identifier tag 746 in a message header 714 of photo message 710 to thereby identify photo message 710 as including the captured photo data for automatic distribution to the designated message targets.

In the FIG. 9 embodiment, source device 112 generates a special photo identifier tag 746 to identify photo message 710 from the designated message targets. However, in various alternate embodiments, source device 112 may also utilize any other effective techniques to identify photo message 710 as requiring special handling of the attached photo data by designated message targets.

Finally, in step 932, mail program 528 of source device 112 may automatically transmit the foregoing photo message 710 with the special photo identifier tag 746 and attached photo data to an appropriate network server in electronic network 110. The FIG. 9 process may then terminate. The FIG. 9 embodiment thus provides an expedited "one-click" method for automatically transmitting photo data from source device 112 to selected messaging targets in electronic network 110.

Figure 10:
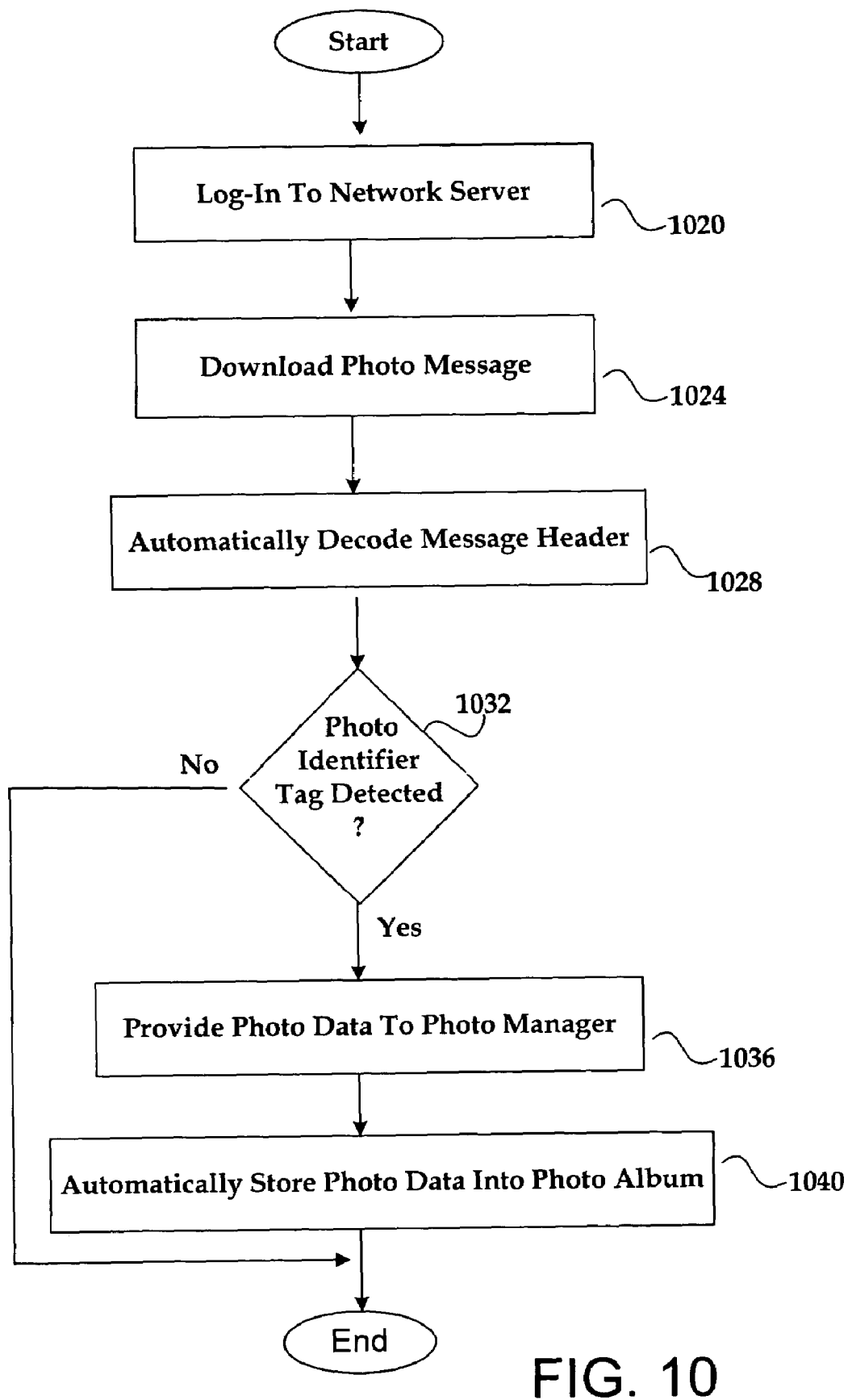
FIG. 10 is a flowchart of method steps for performing an automatic photo message reception procedure, in accordance with one embodiment of the present invention.

Referring now to FIG. 10, a flowchart of method steps for performing an automatic photo-message reception procedure is shown, in accordance with one embodiment of the present invention. The FIG. 10 example is presented for purposes of illustration, and in alternate embodiments, the present invention may readily utilize various other steps and sequences than those discussed in conjunction with the FIG. 10 embodiment.

In accordance with the one embodiment of the present invention, in step 1020, a device user of a target device 128 (FIG. 1) in an electronic network 110 may utilize a mail program 528 of the target device 128 to log-in to an appropriate network server of electronic network 110 by utilizing any effective means. In the FIG. 10 embodiment, the foregoing device user of target device 128 is preferably one of the designated message targets discussed in conjunction with foregoing FIGS. 8 and 9 for receiving a particular photo message 710 from source device 112 in electronic network 110.

In step 1024, mail program 528 of target device 128 may download the particular photo message 710 from the network server in electronic network 110. Then, in step 1028, a special photo-message reader of mail program 528 may automatically decode a message header 714 from the foregoing downloaded photo message 710 by utilizing any effective techniques. For example, in certain embodiments, the photo-message reader of mail program 528 may sequentially parse message header 714 to detect a special photo identifier tag 746 that specifically identifies the corresponding photo message 710 as including attached photo data that requires special automatic handling by target device 128. In the FIG. 10 embodiment, the photo identifier tag 746 may be created by the source device 112 that initially transmitted photo message 710, as discussed in step 828 of FIG. 8 and step 928 of FIG. 9.

In step 1032, mail program 528 of target device 128 may automatically determine whether the photo identifier tag 746 has been detected in message header 714 of photo message 710. In step 1036, if the photo-message reader of mail program 528 successfully detects the photo identifier tag 746 in message header 714 of photo message 710, then in step 1036, mail program 528 may automatically provide the corresponding photo data attached to photo message 710 to a photo manager 524 of target device 128. Finally, in step 1040, the photo manager 524 of target device 128 may automatically store the received photo data into a local photo album 610 corresponding to target device 128 for ready utilization by the device user of target device 128. The FIG. 10 process may then terminate.

The present invention thus provides a streamlined, efficient, and user-friendly mechanism for distributing photo data to designated target devices to thereby automatically populate and synchronize photo albums 610 on a source device 112 and designated target devices 128.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a streamlined photo distribution procedure in an electronic network, comprising:

a photo data source configured to provide photo data to a source device in said electronic network, said photo data being added to a source photo album of said source device;

a source photo manager of said source device configured to designate a message target for receiving said photo data from said source device;

a source mail program of said source device configured to automatically receive said photo data from said source photo manager, said source mail program automatically creating a photo message that includes said photo data and photo identifier means to request a special handling of said photo data, said photo identifier means associating said photo data with a target photo album, said source mail program automatically transmitting said photo message over said electronic network;

a target mail program of a target device corresponding to said message target, said target mail program downloading said photo message from said electronic network, said target mail program automatically detecting said photo identifier means in said photo message; and a target photo manager of said target device configured to receive said photo data from said target mail program whenever said photo identifier means is detected, said target photo manager automatically associating said photo data with said target photo album of said target device, said target photo album being viewed on said target device, said streamlined photo distribution procedure being implemented by utilizing a one-click technique in which a system user performs only one single triggering action to initiate said streamlined photo distribution procedure, said source device responsively capturing said photo data, creating said photo message, and sending said photo message to said target photo album in an automatic manner, said source device and said target device both being implemented as electronic gaming devices in an electronic gaming network.

2. The system of claim 1 wherein said photo data source is implemented as an electronic camera device that communicates with said source device by utilizing at least one of a wireless and a hard-wired communication technique.

3. The system of claim 1 wherein said source device is implemented as a consumer-electronics entertainment device that communicates with said target device through said electronic network.

4. The system of claim 3 wherein said consumer-electronics entertainment device is network-enabled to communicate over said electronic network, and wherein respective stand-alone functionalities of said electronic camera device and said consumer-electronics entertainment device are combined to effectively perform said streamlined photo distribution procedure in said electronic network.

5. The system of claim 3 wherein said consumer-electronics entertainment device is configured to include a hard-disk-drive memory device storing one or more electronic gaming programs, said consumer-electronics entertainment device being further configured to include a broadband navigator and a network adapter for communicating over said electronic network.

6. The system of claim 1 wherein said photo identifier means includes a special photo identifier tag that said source mail program creates as part of a message header of said photo message to thereby identify said photo message as containing said photo data for automatically storing into said target photo album by said target photo manager.

7. The system of claim 1 wherein said electronic network includes an Internet network, said source device communicating with said target device via said Internet network.

8. The system of claim 1 wherein said electronic network includes at least one of an intranet network and a peer-to-peer network, said source device communicating with said target device via said at least one of said intranet network and said peer-to-peer network.

9. The system of claim 1 wherein said target photo album is configured to store and display at least one set of said photo data, said at least one set of said photo data including image data corresponding to a captured photographic image and optional ancillary data related to said image data, said target device utilizing said photo manager to selectively organize and manage said at least one set of said photo data in said photo album.

10. The system of claim 1 wherein said source photo manager of said source device initially performs a message-target pre-selection procedure to designate said message target for receiving said photo data from said source device prior to obtaining said photo data from said photo data source.

11. The system of claim 10 wherein said source photo manager of said source device initiates a streamlined one-click transmission procedure in which said source photo manager captures said photo data from said photo data source, said source photo manager then automatically sending said photo data to said source mail program.

12. The system of claim 11 wherein said source mail program automatically attaches said photo data and said photo identifier means to said photo message, said source mail program then automatically transmitting said photo message to a network server in said electronic network for retrieval by said message target.

13. The system of claim 1 wherein said source photo manager of said source device initiates a streamlined two-click transmission procedure in which said source photo manager captures said photo data from said photo data source, said source photo manager then automatically generating a message-target user interface for designating said message target for receiving said photo data.

14. The system of claim 13 wherein said source photo manager of said source device manages a message-target selection procedure to designate said message target for receiving said photo data from said source device, said source photo manager then automatically sending said photo data to said source mail program.

15. The system of claim 14 wherein said source mail program automatically attaches said photo data and said photo identifier means to said photo message, said source mail program then automatically transmitting said photo message to a network server in said electronic network for retrieval by said message target.

16. The system of claim 1 wherein said target mail program of said target device performs a log-in procedure for communicating with a network server of said electronic network, said target mail program then downloading said photo message from said network server to said target device.

17. The system of claim 16 wherein a special photo-message reader of said target mail program decodes a message header of said photo message to determine whether said photo identifier means is detected as part of said photo message.

18. The system of claim 17 wherein said target mail program automatically provides said photo data to said target photo manager whenever said photo identifier means is detected, said target photo manager automatically storing said photo data into said target photo album of said target device.

19. The system of claim 1 wherein said source photo manager designates a plurality of message targets for receiving said photo data from said source device, said source mail program of said source device automatically transmitting a plurality of photo messages over said electronic network to said plurality of message targets, a plurality of target devices automatically storing respective copies of said photo data into corresponding target photo albums.

20. The system of claim 1 wherein said photo message is alternately implemented to distribute at least one of audio data, graphics data, video data, and text data instead of said photo data.

21. A method for performing a streamlined photo distribution procedure in an electronic network, comprising the steps of:
providing photo data from a photo data source to a source device in said electronic network, said photo data being added to a source photo album of said source device;
designating a message target for receiving said photo data from said source device by using a source photo manager of said source device;
utilizing a source mail program of said source device to automatically receive said photo data from said source photo manager, said source mail program automatically creating a photo message that includes said photo data and photo identifier means to request a special handling of said photo data, said photo identifier means associating said photo data with a target photo album, said source mail program automatically transmitting said photo message over said electronic network;
downloading said photo message from said electronic network by utilizing a target mail program of a target device corresponding to said message target, said target mail program automatically detecting said photo identifier means in said photo message; and
receiving said photo data from said target mail program by utilizing a target photo manager of said target device whenever said photo identifier means is detected, said target photo manager automatically associating said photo data with said target photo album of said target device, said target photo album being viewed on said target device, said streamlined photo distribution procedure being implemented by utilizing a one-click technique in which a system user performs only one single triggering action to initiate said streamlined photo distribution procedure, said source device responsively capturing said photo data, creating said photo message, and sending said photo message to said target photo album in an automatic manner, said source device and said target device both being implemented as electronic gaming devices in an electronic gaming network.

22. The method of claim 21 wherein said photo data source is implemented as an electronic camera device that communicates with said source device by utilizing at least one of a wireless and a hard-wired communication technique.

23. The method of claim 21 wherein said source device is implemented as a consumer-electronics entertainment device that communicates with said target device through said electronic network.

24. The method of claim 23 wherein said consumer-electronics entertainment device is network-enabled to communicate over said electronic network, and wherein respective stand-alone functionalities of said electronic camera device and said consumer-electronics entertainment device are combined to effectively perform said streamlined photo distribution procedure in said electronic network.

25. The method of claim 23 wherein said consumer-electronics entertainment device is configured to include a hard-disk-drive memory device storing one or more electronic gaming programs, said consumer-electronics entertainment device being further configured to include a broadband navigator and a network adapter for communicating over said electronic network.

26. The method of claim 21 wherein said photo identifier means includes a special photo identifier tag that said source mail program creates as part of a message header of said photo message to thereby identify said photo message as containing said photo data for automatically storing into said target photo album by said target photo manager.

27. The method of claim 21 wherein said electronic network includes an Internet network, said source device communicating with said target device via said Internet network.

28. The method of claim 21 wherein said electronic network includes at least one of an intranet network and a peer-to-peer network, said source device communicating with said target device via said at least one of said intranet network and said peer-to-peer network.

29. The method of claim 21 wherein said target photo album is configured to store and display at least one set of said photo data, said at least one set of said photo data including image data corresponding to a captured photographic image and optional ancillary data related to said image data, said target device utilizing said photo manager to selectively organize and manage said at least one set of said photo data in said photo album.

30. The method of claim 21 wherein said source photo manager of said source device initially performs a message-target pre-selection procedure to designate said message target for receiving said photo data from said source device prior to obtaining said photo data from said photo data source.

31. The method of claim 30 wherein said source photo manager of said source device initiates a streamlined one-click transmission procedure in which said source photo manager captures said photo data from said photo data source, said source photo manager then automatically sending said photo data to said source mail program.

32. The method of claim 31 wherein said source mail program automatically attaches said photo data and said photo identifier means to said photo message, said source mail program then automatically transmitting said photo message to a network server in said electronic network for retrieval by said message target.

33. The method of claim 21 wherein said source photo manager of said source device initiates a streamlined two-click transmission procedure in which said source photo manager captures said photo data from said photo data source, said source photo manager then automatically generating a message-target user interface for designating said message target for receiving said photo data.

34. The method of claim 33 wherein said source photo manager of said source device manages a message-target selection procedure to designate said message target for receiving said photo data from said source device, said source photo manager then automatically sending said photo data to said source mail program.

35. The method of claim 34 wherein said source mail program automatically attaches said photo data and said photo identifier means to said photo message, said source mail program then automatically transmitting said photo message to a network server in said electronic network for retrieval by said message target.

36. The method of claim 21 wherein said target mail program of said target device performs a log-in procedure for communicating with a network server of said electronic network, said target mail program then downloading said photo message from said network server to said target device.

37. The method of claim 36 wherein a special photo-message reader of said target mail program decodes a message header of said photo message to determine whether said photo identifier means is detected as part of said photo message.

38. The method of claim 37 wherein said target mail program automatically provides said photo data to said target photo manager whenever said photo identifier means is detected, said target photo manager automatically storing said photo data into said target photo album of said target device.

39. The method of claim 21 wherein said source photo manager designates a plurality of message targets for receiving said photo data from said source device, said source mail program of said source device automatically transmitting a plurality of photo messages over said electronic network to said plurality of message targets, a plurality of target devices automatically storing respective copies of said photo data into corresponding target photo albums.

40. The method of claim 21 wherein said photo message is alternately implemented to distribute at least one of audio data, graphics data, video data, and text data instead of said photo data.

41. A computer-readable storage medium comprising program instructions for performing a streamlined photo distribution procedure in an electronic network, by performing the steps of:

providing photo data from a photo data source to a source device in said electronic network, said photo data being added to a source photo album of said source device;

designating a message target for receiving said photo data from said source device by using a source photo manager of said source device;

utilizing a source mail program of said source device to automatically receive said photo data from said source photo manager, said source mail program automatically creating a photo message that includes said photo data and photo identifier means to request a special handling of said photo data, said photo identifier means associating said photo data with a target photo album, said source mail program automatically transmitting said photo message over said electronic network;

downloading said photo message from said electronic network by utilizing a target mail program of a target device corresponding to said message target, said target mail program automatically detecting said photo identifier means in said photo message; and receiving said photo data from said target mail program by utilizing a target photo manager of said target device whenever said photo identifier means is detected, said target photo manager automatically associating said photo data with said target photo album of said target device, said target photo album being viewed on said target device, said streamlined photo distribution procedure being implemented by utilizing a one-click technique in which a system user performs only one single triggering action to initiate said streamlined photo distribution procedure, said source device responsively capturing said photo data, creating said photo message, and sending said photo message to said target photo album in an automatic manner, said source device and said target device both being implemented as electronic gaming devices in an electronic gaming network.

42. A system for performing a streamlined photo distribution procedure in an electronic network, comprising:

means for providing photo data to a source device in said electronic network, said photo data being added to a source photo album of said source device;

means for designating a message target for receiving said photo data from said source device;

means for receiving said photo data automatically from said means for designating, said means for receiving automatically creating a photo message that includes said photo data and photo identifier means to request special handling of said photo data, said photo identifier means associating said photo data with a target photo album, said means for receiving automatically transmitting said photo message over said electronic network;

means for downloading said photo message from said electronic network, said means for downloading automatically detecting said photo identifier means in said photo message; and means for accessing said photo data from said means for downloading whenever said photo identifier means is detected, said means for accessing automatically associating said photo data with said target photo album of said messaging target, said target photo album being viewed on said messaging target, said streamlined photo distribution procedure being implemented by utilizing a one-click technique in which a system user performs only one single triggering action to initiate said streamlined photo distribution procedure, said source device responsively capturing said photo data, creating said photo message, and sending said photo message to said target photo album in an automatic manner, said source device and said message target both being implemented as electronic gaming devices in an electronic gaming network.

43. A system for performing a streamlined photo distribution procedure in an electronic network, comprising:

a portable electronic device configured to provide photo data to a source device via a communications network, said photo data being added to a source photo album of said source device, said portable electronic device automatically creating a special identifier tag to designate said photo data for said streamlined photo distribution procedure;

a source photo manager of said source device configured to receive said photo data and said special identifier tag from said portable electronic device via said communications network, said source photo manager designating a message target group for receiving said photo data from said source device; and a source mail program of said source device configured to automatically receive said photo data from said source data manager, said source mail program automatically creating a photo message that includes said photo data and a photo identifier tag to request a special handling of said photo data, said photo identifier tag associating said photo data with a target photo album, said source mail program automatically transmitting said photo message over said electronic network to said message target group, said photo data being viewed on respective target devices of said message target group, said streamlined photo distribution procedure being implemented by utilizing a one-click technique in which a system user performs only one single triggering action to initiate said streamlined photo distribution procedure, said source device responsively capturing said photo data, creating said photo message, and sending said photo message to said target photo album in an automatic manner, said source device and said respective target devices being implemented as electronic gaming devices in an electronic gaming network.

44. The system of claim 1 wherein said photo distribution procedure automatically synchronizes said source photo album and said target photo album to contain identical digital photographs.

45. The system of claim 1 wherein said photo identifier means is created concurrently with sending said photo message to said target device, said photo identifier means not being created beforehand.

46. The system of claim 1 wherein said source device and said target device are implemented by utilizing a substantially similar device configuration.

47. The system of claim 1 wherein said source device and said photo data source are two separate non-integral electronic devices.

48. The system of claim 1 wherein said source device transmits said photo message directly to said target device through a peer-to-peer connection that does not include any intermediate server device.

49. The system of claim 1 wherein said photo data source transmits said photo data directly to said source device through a direct electrical connection that does not include any intermediate server device.

50. The system of claim 1 wherein said photo message transmits auxiliary data that includes text data and audio data.

51. The system of claim 1 wherein said photo data is transmitted in a full-resolution format as originally captured by said photo data source.

* * * * *